(12) United States Patent
Bryant

(10) Patent No.: US 9,061,624 B2
(45) Date of Patent: Jun. 23, 2015

(54) LIFT AND ROLL LOAD SYSTEM

(71) Applicant: GM Global Technology Operations LLC, Detroit, MI (US)

(72) Inventor: Wade W. Bryant, Grosse Pointe Farms, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 118 days.

(21) Appl. No.: 13/746,156

(22) Filed: Jan. 21, 2013

(65) Prior Publication Data

US 2014/0205409 A1 Jul. 24, 2014

(51) Int. Cl.
*B60P 1/48* (2006.01)
*B60P 1/44* (2006.01)
*B60P 1/64* (2006.01)

(52) U.S. Cl.
CPC ............. *B60P 1/48* (2013.01); *B60P 1/4414* (2013.01); *B60P 1/6436* (2013.01)

(58) Field of Classification Search
CPC ........................................................ B60P 1/48
USPC .......... 414/469, 470, 491–493, 539–541, 545
See application file for complete search history.

(56) References Cited

U.S. PATENT DOCUMENTS

| | | | | | |
|---|---|---|---|---|---|
| 3,074,570 | A | * | 1/1963 | Venziani | 414/541 |
| 3,484,003 | A | * | 12/1969 | Strandberg et al. | 414/541 |
| 4,175,904 | A | * | 11/1979 | Airaksinen | 414/421 |
| 4,470,747 | A | * | 9/1984 | Tichenor | 414/491 |
| 6,428,264 | B1 | * | 8/2002 | Jensen et al. | 414/492 |
| 8,100,623 | B2 | * | 1/2012 | Rogers | 414/425 |
| 2003/0017039 | A1 | * | 1/2003 | Young et al. | 414/537 |
| 2011/0318148 | A1 | * | 12/2011 | Obermeyer | 414/469 |

* cited by examiner

*Primary Examiner* — Kaitlin Joerger
(74) *Attorney, Agent, or Firm* — BrooksGroup

(57) ABSTRACT

One variation may include a product including a vehicle including a powered lift arm connected thereto and a hand connected to the powered lift arm, and a body panel ramp, the hand being constructed arranged to capture a grab pin on a container, and wherein the powered lift arm, the hand in the body panel ramp are constructed and arranged so that the power lift arm may load and unload a container onto and off of the vehicle wherein the container rolls over the body panel ramp. One variation may include a method including providing a vehicle and a container, wherein the vehicle including at least one powered lift arm connected thereto, a hand connected to the powered lift arm, and a body panel ramp, the hand capturing a grab pin on the container, unloading the container from the vehicle comprising moving the at least one power lift arm so that the container rolls along and off of the body panel ramp and off of the vehicle.

26 Claims, 5 Drawing Sheets

LIFT AND ROLL LOAD SYSTEM

TECHNICAL FIELD

The field to which the disclosure generally relates to includes systems, vehicles, containers, and methods of loading and unloading containers from vehicles.

BACKGROUND

Conventional trucks with lift systems need to provide a large loading platform that can bear the weight of the cargo being loaded and unloaded. The load platforms take up space on the truck and the paths that they move within consume space around the vehicle when in use. Because of the inefficiencies of such list systems, such systems usually only are installed in one or two places on the truck bed which means cargo needs to be loaded and unloaded sequentially which is problematic on multi-stop delivery routes.

SUMMARY OF ILLUSTRATIVE VARIATIONS OF THE INVENTION

One variation may include a product including a vehicle including at least one powered lift arm connected thereto, a hand connected to the powered lift arm, and a body panel ramp, the hand being constructed and arranged to capture a grab pin on a container, and wherein the powered lift arm, the hand and the body panel ramp are constructed and arranged so that the power lift arm may load and unload a container onto and off of the vehicle wherein the container rolls over the body panel ramp.

One variation may include a method including providing a vehicle and a container, wherein the vehicle includes at least one powered lift arm connected thereto, a hand connected to the powered lift arm, and a body panel ramp, the hand capturing a grab pin on the container, unloading the container from the vehicle comprising moving the at least one power lift arm so that the container rolls along and off of the body panel ramp and off of the vehicle.

One variation may include a method further comprising providing a push member and moving the push member to push the container towards the body panel ramp before or at the same time as moving the at least one power lift arm so that the container rolls along and off of the body panel ramp and off of the vehicle.

Other illustrative variations of the invention will become apparent from the detailed description provided hereinafter. It should be understood that the detailed description and specific examples, while disclosing optional variations of the invention, are intended for purposes of illustration only and are not intended to limit the scope of the invention.

BRIEF DESCRIPTION OF THE DRAWINGS

Select examples of variations of the invention will become more fully understood from the detailed description and the accompanying drawings, wherein.

DETAILED DESCRIPTION OF ILLUSTRATIVE VARIATIONS OF THE INVENTION

The following description of the variations is merely illustrative in nature and is in no way intended to limit the invention, its application, or uses.

Figure 1:
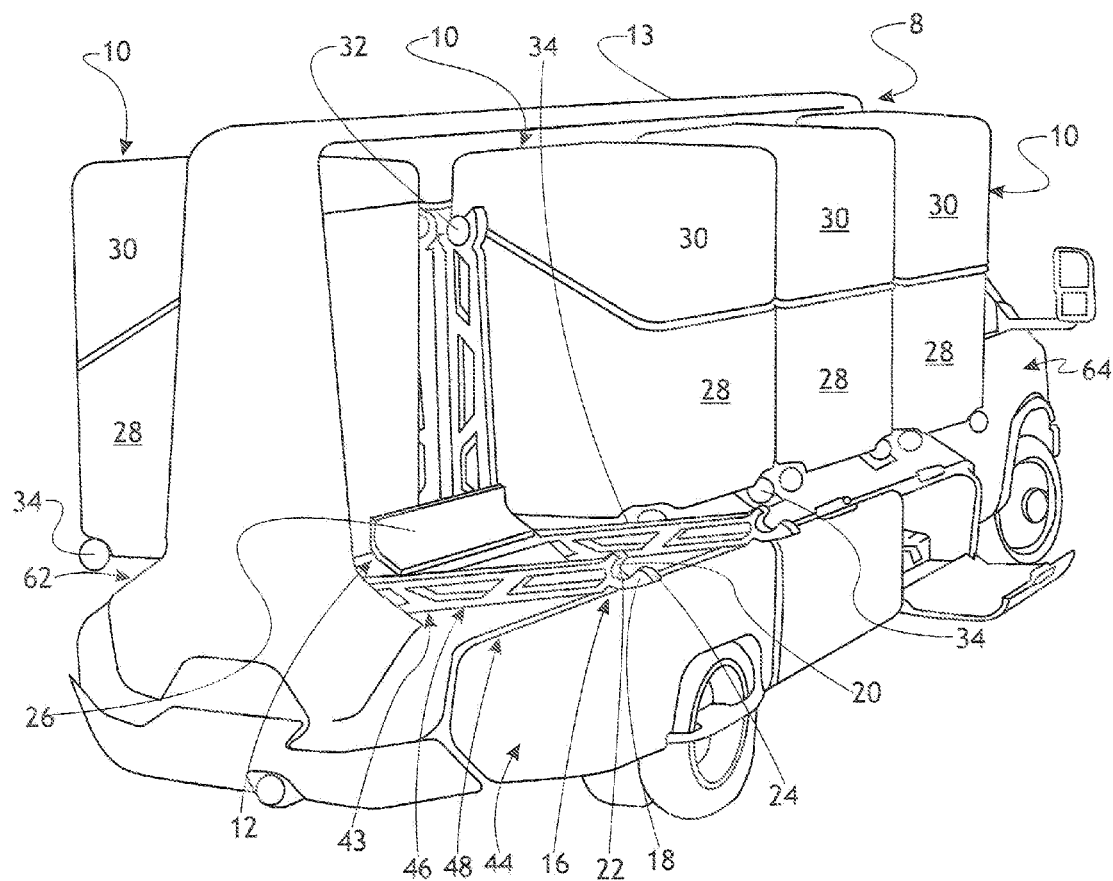
FIG. 1 is a perspective rear view of a vehicle including a lift and roll load system having at least one powered lift arm to raise and lower a container on and off of the vehicle according to a number of variations of the invention.

A number of variations of the invention are illustrated in FIG. 1 and may include a vehicle 8 constructed and arranged to load and unload a plurality of containers 10 onto a bed area 12 of the vehicle 8. The vehicle 8 may include at least one powered lift arm 14 pivotally connected to the vehicle utilizing any of a number of support structures including but not limited to the vehicle frame (not shown), vehicle bed 8, and elevated rail 13 overlying the bed area 12 of the vehicle, or any other suitable support structure. The powered lift arm 14 may have a hand 16 attached thereto including a first finger 18 and a second finger 20 defining a palm 22 constructed and arranged to receive a grab pin 32 on the container 10. The first finger 18 may have a ramped surface 24 constructed and arranged to allow the grab pin 32 to be rolled up the ramped surface 24 and received in the palm 22 area of the hand 16. The first finger 18 may extend a distance further than the second finger so that the hand securely captures the grab pin 32 and supports the container 10. A push member 26 may be connected to the vehicle using any suitable support structure of the vehicle including, but not limited to, the vehicle frame, vehicle bed or a body panel. In a number of variations a pair of powered lift arms 14 may be provided each having a hand 16 for respectively receiving one of a pair grab pin 32 wherein the grabs pins are positioned on opposite sides of the container 10. A number of variations of the push member 26 will be described hereafter.

The container 10 may be constructed and arranged to carry a variety of items or cargo. In a number of variations, the container 10 may include a lower portion 28 and an upper portion 30 pivotally connected thereto wherein the lower portion 28 and the upper portion 30 define a cavity or space for receiving the cargo. In other variations, the container 10 may be open and may not be capable of being closed. As described previously, the container 10 may be equipped with at least one grab pin 32 constructed and arranged so that container 10 may be lifted by the power lift arm 14. A plurality of wheels 34 may be connected to the container 10 so that the container 1-0 may be moved from one place to another and so that the container may roll up and down a body panel ramp 42 as described hereafter.

Figure 2:
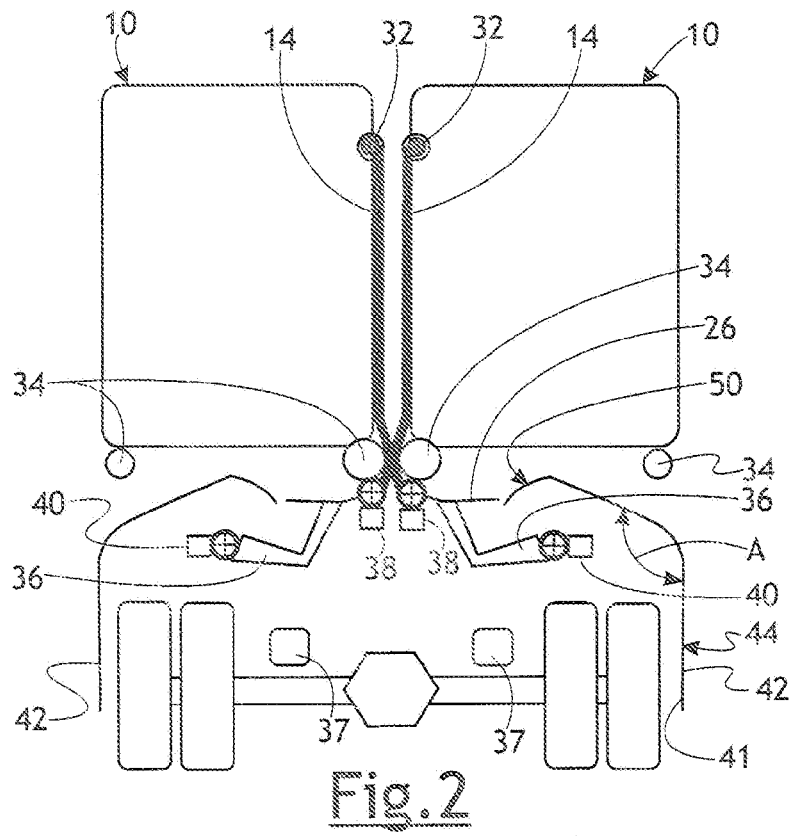
FIG. 2 is a schematic illustration of an end view of a vehicle including a lift and roll load system having at least one powered lift arm to raise and lower a container on and off of the vehicle and illustrating the containers in a first uppermost position suitable for transporting the containers by the vehicle from one location to another according to a number of variations of the invention.

A number of variations of the invention are illustrated in FIG. 2, and may include the powered lift arm 14 pivotally connected to the vehicle and connected to the powered push member 26. The powered lift arm 14 may be pivotally connected to a portion of the frame 37, the vehicle bed 12, a body panel or any other suitable support structure. A first power assist 38 may be operatively connected to the powered lift arm 14 for moving the arm to cause the container 10 to be loaded and unloaded off of the vehicle. The first power assist 38 may include electric motor, an electrically driven piston, a hydraulic piston, a pneumatic piston, or any other suitable power system for moving the powered lift arm 14.

A second power assist 40 may be provided in operatively connected to the push member arm 36 to move the push member 26 to move the container 10 toward and onto the body panel ramp 42. The second power assist 40 may include electric motor, an electrically driven piston, a hydraulic piston, a pneumatic piston or any other suitable power system for moving the push member arm 36. In a number of other variations, the push number 26 may be propelled by an electrically driven piston, hydraulic piston, pneumatic piston or other suitable power system to advance the push member 26 against the container 10 and move the container 10 towards and onto the body panel ramp 42. IN a number of variations the push member 26 may include a push plate that may have a curved surface over which the container may roll.

The body panel ramp 42 may be made up of a single piece, several pieces connected together or separate pieces spaced apart from each but arranged in a manner that provides a path for the container 22 be rolled off of the vehicle 8. In a number of variations, the body panel ramp 20 may have a free end 41 nearest the surface on which the vehicle rest such as the ground or street pavement. The body panel ramp 42 may include a first portion which may extend in a generally vertical direction from the surface on which the vehicle rest. A second portion 46 may be provided and connected to the first portion 44 of the body panel, for example by a curve or bent portion 48. The second portion 46 may extend at an acute angle so that the container 10 may be rolled down the second portion 46 wherein the container moves simultaneously in both a vertical and horizontal directions. In acute angle illustrated by arrow A may be generally formed by the intersection of the first portion 44 and the second portion 46 of the body panel ramp 42. A downwardly curved portion 50 may be connected to the second portion 46 of the body panel ramp 42. In one variation, best seen in FIG. 1, a notch 43 may be provided in the body panel ramp 42 to receive the powered lift arm 14 as it is lowered. In a number of variations the body panel ramp 42 may be curved so that the container rolls along a curved path to load and unload the container 10 from the vehicle 8.

Figure 3:
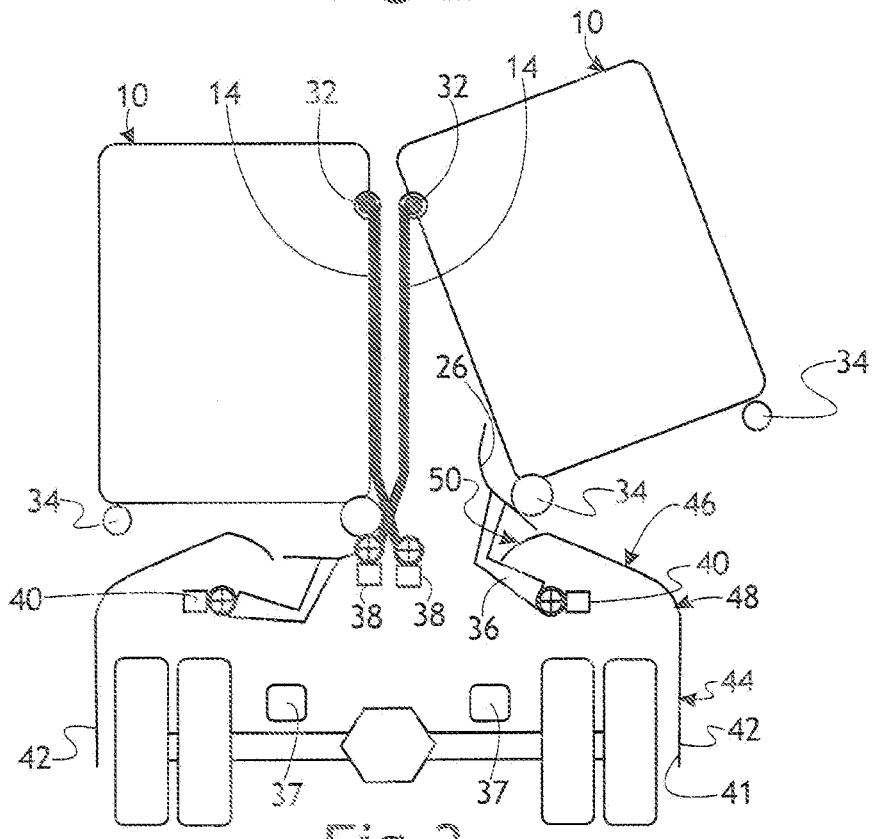
FIG. 3 is a schematic illustration of an end view of a vehicle including a lift and roll load system having at least one powered lift arm to raise and lower a container on and off of the vehicle and illustrating a container being pushed into a second position moving the container towards a vehicle panel ramp according to a number of variations of the invention.

Referring now to FIG. 3, according to a number of variations, the push member arm 36 may be pivotally rotated so that the push member 26 engages the container 10 to move the container towards the second portion 46 of the body panel ramp 42. In one variation the powered push member 26 engages a rear wheel 34 of the container 10 so that the rear wheel 34 may roll along a curved portion of the push member 26.

Figure 4:
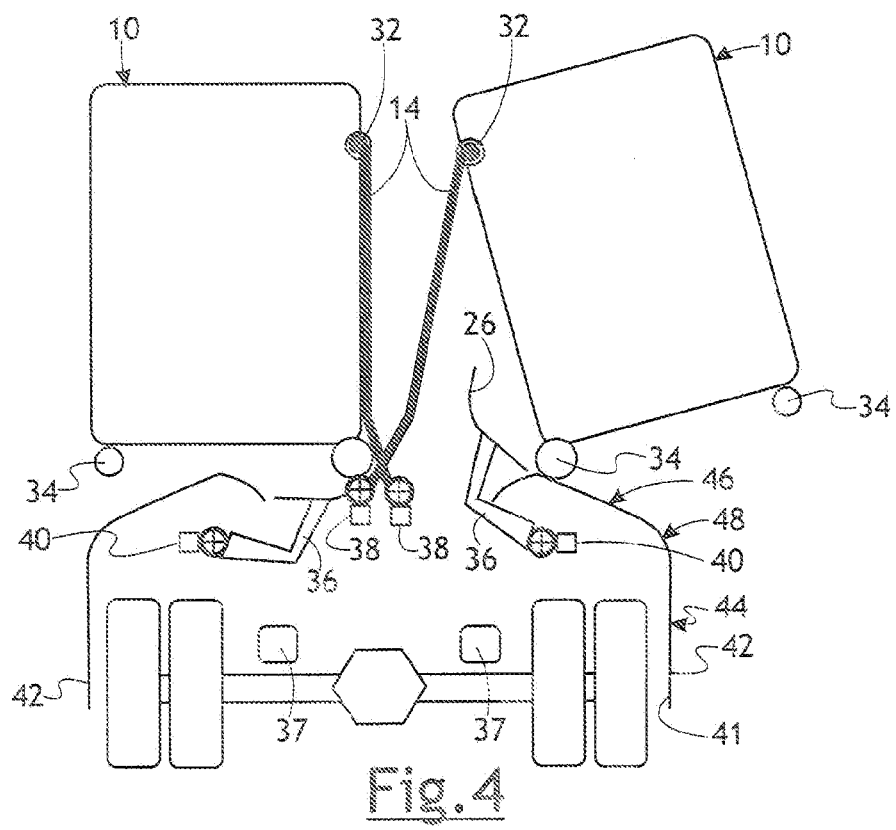
FIG. 4 is a schematic illustration of an end view of a vehicle including a lift and roll load system having at least one powered lift arm to raise and lower a container on and off of the vehicle and illustrating a container starting to roll along a portion of a body panel ramp at an acute angle according to a number of variations of the invention.

Referring now to FIG. 4, the powered lift arm 14 may be moved so that the container 10 begins to roil down the second portion 46 of the body panel ramp 42.

Figure 5:
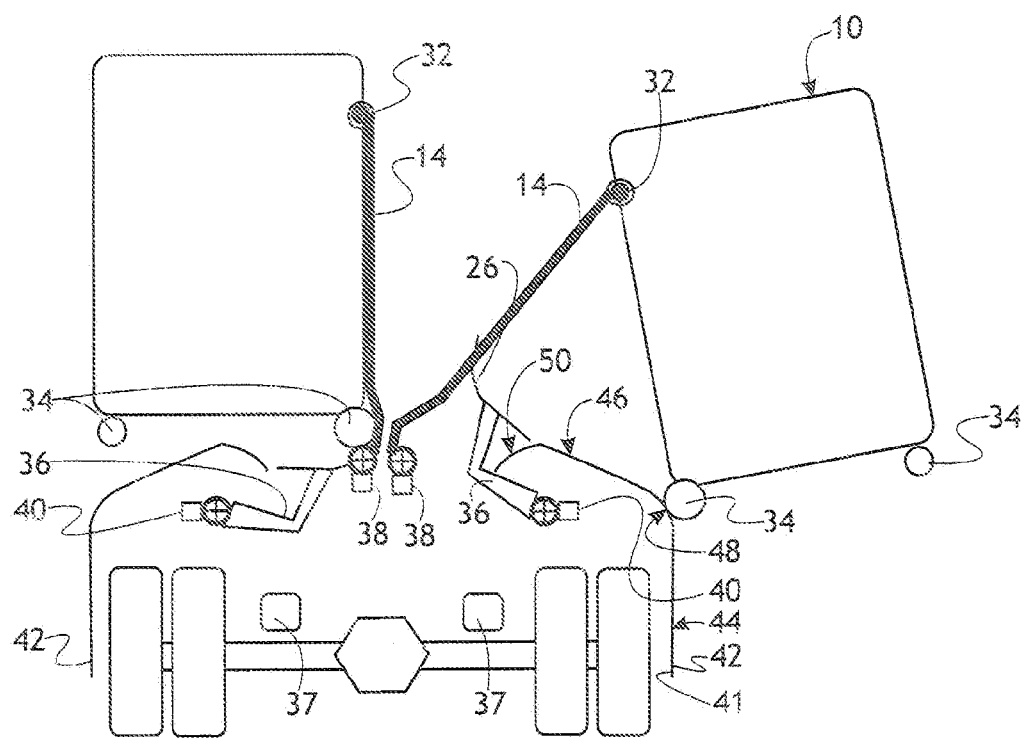
FIG. 5 is a schematic illustration of an end view of a vehicle including a lift and roll load system having at least one powered lift arm to raise and lower a container on and off of the vehicle and illustrating a container rolling over a curved or bent portion of a body panel ramp positioned between a portion of the body panel ramp formed at an acute angle and a portion of the body panel ramp extending in a generally vertical direction according to a number of variations of the invention.

Referring now to FIG. 5, the power lift arm 14 may be further moved so that container 10 may roll from the second portion 46 of the body panel ramp 42. In a number of variations, the container 10 may roll over a curved or bent portion 48 position between the first portion 44 and second portion 46 of the body panel ramp 42.

Figure 6:
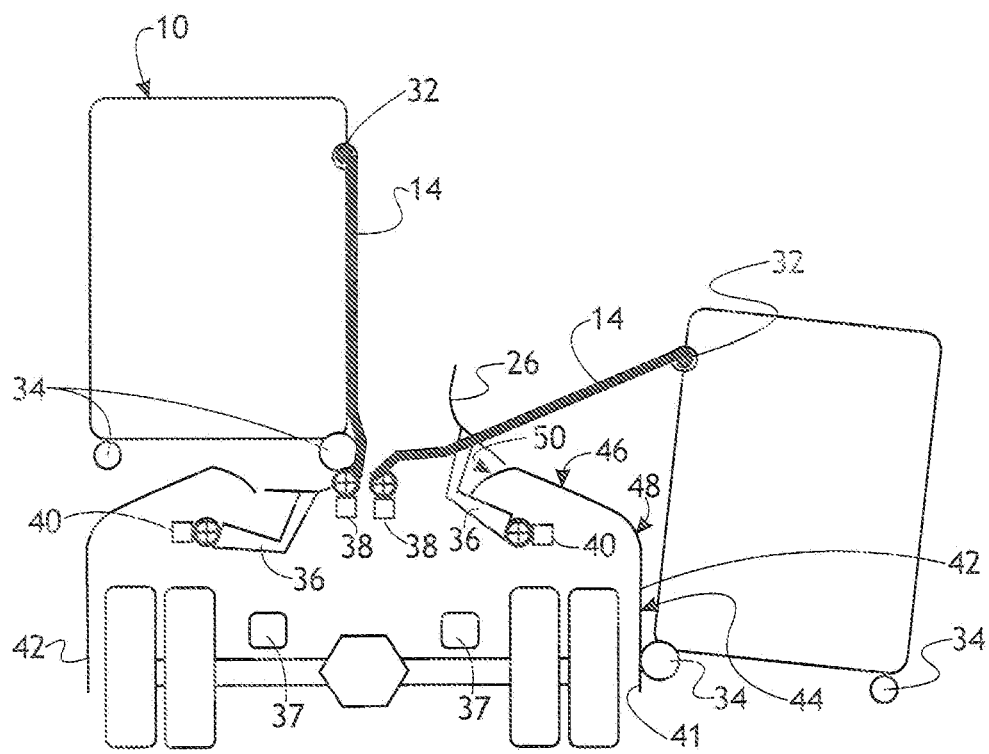
FIG. 6 is a schematic illustration of an end view of a vehicle including a lift and roll load system having at least one powered lift arm to raise and lower a container on and off of the vehicle and illustrating a container rolling over a portion of the body panel ramp that extends in a generally vertical direction according to a number of variations of the invention.

Referring now to FIG. 6, the power lift arm 14 may be further moved to cause the container to roll down the first portion 44 of the body panel ramp 42.

Figure 7:
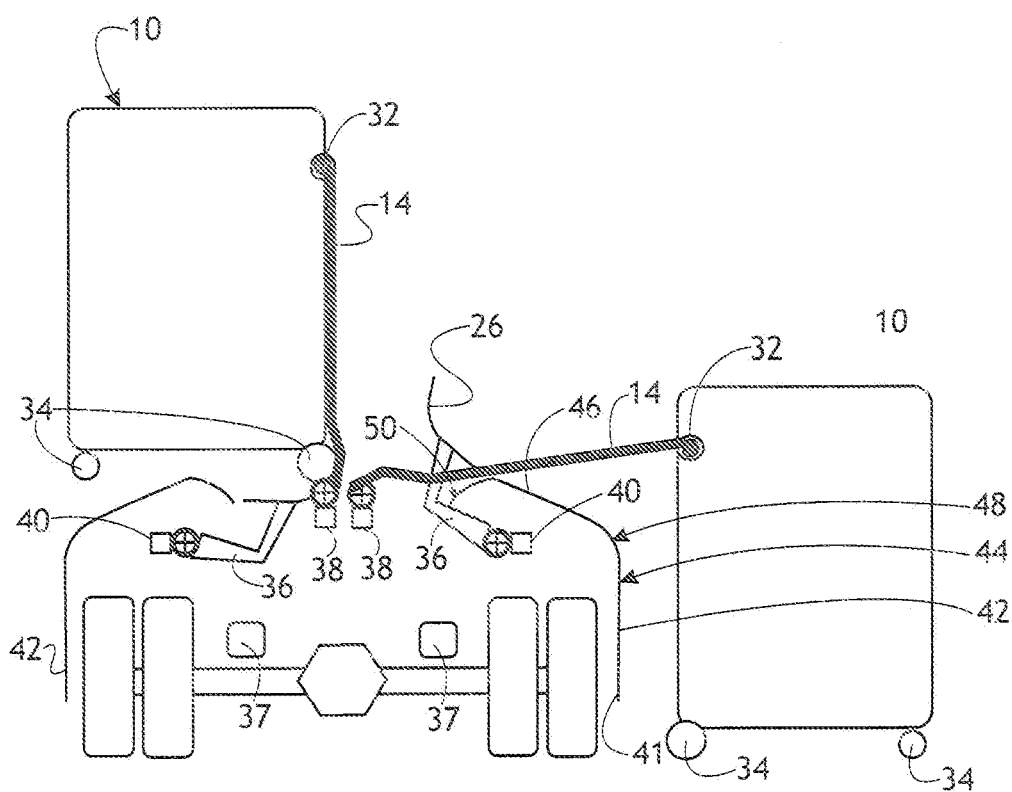
FIG. 7 is a schematic illustration of an end view of a vehicle including a lift and roll load system having at least one powered lift arm to raise and lower a container on and off of the vehicle and illustrating the powered lift arms being extended so that the container is off loaded from the vehicle and onto the ground or other platform adjacent the vehicle according to a number of variations of the invention.

Referring now to FIG. 7, the power lift arm 14 may be further extended so that the container 10 moves off of the first portion 44 of the body panel ramp 42 and onto the surface on which the vehicle rest or onto another suitable surface or platform. The container 10 may then be disconnected from the power lift arm 14, for example by rolling the container off of the first finger 18.

Figure 8:
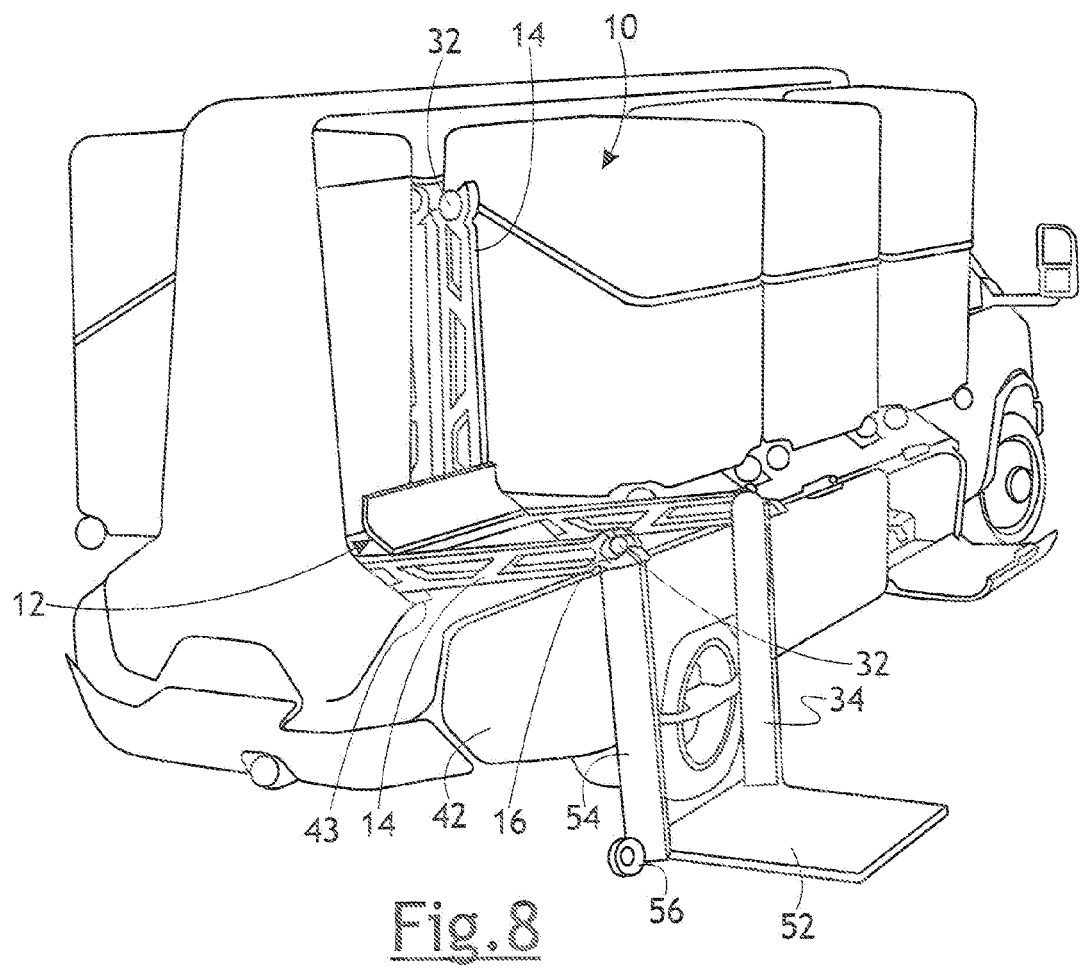
FIG. 8 is a perspective rear view of a vehicle including a lift and roll load system having at least one powered lift arm to raise and lower a container on and off of the vehicle wherein a lift platform is connected to the at least one powered lift arm according to a number of variations of the invention.

A number of variations of the invention are illustrated by FIG. 8 which may include a lift platform 52 connected to one or more power lift arms 14. In a number of variations, at least one lift arm 54 may be connected to the lift platform 52. A second grab pin 32 may be attached to the lift arm 54 in may be received in the hand 16 connected to the power lift arm 14. Containers 10 with or without wheels may be placed on the power lift platform 52 and loaded onto and off of the vehicle 8.

Figure 9:
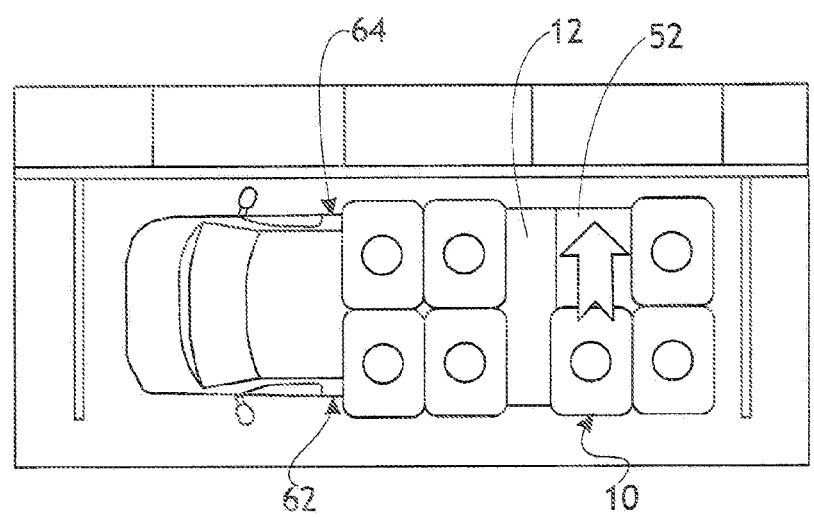
FIG. 9 is a plan view of a vehicle including a lift and roil load system having at least one powered lift arm to raise and lower a container on and off of the vehicle wherein a lift platform is connected to the at least one powered lift arm and illustrating the movement of a container from one side of the vehicle to the other side of the vehicle and onto a lift platform according to a number of variations of the invention.

Referring now to FIG. 9, a container 10 may be moved from a first side 62 to a second side of the vehicle 64 and may move from one platform to another platform 52 to facilitate easy loading and unloading of containers from the second side of the vehicle 64 which may be positioned next to a curbside of a delivery location.

In a number of variations of the invention, a vehicle 8 including a lift and roll load system as described above may provide for a quick way to load and unload cargo containers from a conventional-height truck bed platform and may allow containers 10 to be loaded in any order and simultaneously from one or more sides of the vehicle.

The following description of variants is only illustrative of components, elements, acts, product and methods considered to be within the scope of the invention and are not in any way intended to limit such scope by what is specifically disclosed or not expressly set forth. The components, elements, acts, product and methods as described herein may be combined and rearranged other than as expressly described herein and still are considered to be within the scope of the invention.

Variation 1 may include a product including a vehicle including at least one powered lift arm connected thereto, a hand connected to the powered lift arm, and a body panel ramp, the hand being constructed and arranged to capture a grab pin on a container, and wherein the powered lift arm, the hand and the body panel ramp are constructed and arranged so that the power lift arm may load and unload a container onto and off of the vehicle wherein the container rolls over the body panel ramp.

Variation 2 may include a product as set forth in Variation 1 further comprising a container having at least one grab pin thereon constructed and arranged to be received by the hand attached to the powered lift arm.

Variation 3 may include a product as set forth in any of Variations 1-2 further comprising a push member connected to the vehicle and constructed and arranged to push a container resting on the vehicle in a direction towards the body panel ramp.

Variation 4 may include a product as set forth in any of Variations 1-3 wherein the push member comprises a push plate having a curved surface constructed and arranged so that a container having at least one wheel may roll along the curved surface of the push plate.

Variation 5 may include a product as set forth in any of Variations 1-4 further comprising a powered push arm connected to the push member.

Variation 6 may include a product as set forth in any of Variations 1-5 further comprising a power assist connected to the push member.

Variation 7 may include a product as set forth in any of Variations 1-6 wherein the power assist comprises at least one of an electrically driven piston, a hydraulic piston, or a pneumatic piston.

Variation 8 may include a product as set forth in any of Variations 1-7 wherein the at least one powered lift arm comprises a first powered lift arm and second powered lift arm constructed and arranged so that the first powered lift arm includes a first hand for receiving a grab pin on one side of the container and the second powered lift arm having a second hand attached thereto for receiving a grab pin on another side of the container.

Variation 9 include a product as set forth in any of Variations 1-8 wherein the body panel ramp includes an angled portion formed at an acute angle so that a container rolling down the angled portion moves in both a horizontal and vertical direction with respect to the vehicle.

Variation 10 may include a product as set forth in any of Variations 1-9 wherein the body panel ramp includes a first portion extending in a generally vertical direction so that a container may roll down the first portion and off of the vehicle.

Variation 11 may include a product as set forth in any of Variations 1-10 wherein the body panel ramp further includes a first portion extending in a generally vertical direction and coupled to the angled portion so that a container may be rolled along the angled portion and down the first portion and off of the vehicle.

Variation 12 may include a product as set forth in any of Variations 1-11 further comprising a container platform pivotally connected to the hand and constructed and arranged to carry a container as the container is moved on to the vehicle.

Variation 13 may include a method including providing a vehicle and a container, wherein the vehicle including at least one powered lift arm connected thereto, a hand connected to the powered lift arm, and a body panel ramp, the hand capturing a grab pin on the container, unloading the container from the vehicle comprising moving the at least one power lift arm so that the container rolls along and off of the body panel ramp and off of the vehicle.

Variation 14 may include a method as set forth in Variation 13 further comprising providing a push member and moving the push member to push the container towards the body panel ramp before or at the same time as moving the at least one power lift arm so that the container rolls along and off of the body panel ramp and off of the vehicle.

Variation 15 may include a method as set forth in any of Variations 13-14 further comprising loading a second container onto the vehicle comprising lowering the at least one powered lift arm and moving the container so that the hand captures the grab pin of the container and lifting at least one powered lift arm so that the container rolls up the body panel ramp and onto the vehicle.

Variations 16 may include a method as set forth in any of Variations 13-15 wherein the push member comprises a push plate having a curved surface constructed and arranged so that a container having at least one wheel may roll along the curved surface of the push plate.

Variation 17 may include a method as set forth in any of Variations 13-16 further comprising a powered push arm connected to the push member and wherein the moving the push member to push the container towards the body panel ramp comprises moving the powered push arm.

Variation 18 may include a method as set forth in any of Variations 13-17 further comprising a power assist connected to the push member.

Variation 19 may include a method as set forth in any of Variations 13-18 wherein the power assist comprises at least one of an electrically driven piston, a hydraulic piston, or a pneumatic piston.

Variation 20 may include a method as set forth in any of Variations 13-19 wherein the body panel ramp further includes a first portion extending in a generally vertical direction and coupled to an angled portion so that and wherein the container unloading comprises moving the container along the angled portion and down the first portion and off of the vehicle.

The above description of select examples of the invention is merely exemplary in nature and, thus, variations or variants thereof are not to be regarded as a departure from the spirit and scope of the invention.

What is claimed is:

1. A product comprising:
a vehicle including at least one powered lift arm connected thereto, a hand connected to the powered lift arm, and a body panel ramp, the hand being constructed and arranged to capture a grab pin on a container, and wherein the powered lift arm, the hand and the body panel ramp are constructed and arranged so that the power lift arm may load and unload a container onto and off of the vehicle wherein the container rolls over the body panel ramp.

2. A product as set forth in claim 1 wherein the at least one powered lift arm comprises a first powered lift arm and second powered lift arm constructed and arranged so that the first powered lift arm includes a first hand for receiving a grab pin on one side of the container and the second powered lift arm having a second hand attached thereto for receiving a grab pin on another side of the container.

3. A product comprising:
a vehicle including at least one powered lift arm connected thereto, a hand connected to the powered lift arm, and a body panel ramp, the hand being constructed and arranged to capture a grab pin on a container, and wherein the powered lift arm, the hand and the body panel ramp are constructed and arranged so that the power lift arm may load and unload a container onto and off of the vehicle wherein the container rolls over the body panel ramp, further comprising a push member connected to the vehicle and constructed and arranged to push a container resting on the vehicle in a direction towards the body panel ramp, wherein the push member comprises a push plate having a curved surface constructed and arranged so that a container having at least one wheel may roll along the curved surface of the push plate.

4. A product as set forth in claim 3 further comprising a powered push arm connected to the push member.

5. A product as set forth in claim 3 further comprising a power assist connected to the push member.

6. Product as set forth in claim 5 wherein the power assist comprises at least one of an electrically driven piston, a hydraulic piston, or a pneumatic piston.

7. A product comprising:
a vehicle including at least one powered lift arm connected thereto, a hand connected to the powered lift arm, and a body panel ramp, the hand being constructed and arranged to capture a grab pin on a container, and wherein the powered lift arm, the hand and the body panel ramp are constructed and arranged so that the power lift arm may load and unload a container onto and off of the vehicle wherein the container rolls over the body panel ramp, wherein the body panel ramp includes an angled portion formed at an acute angle so that a container rolling down the angled portion moves in both a horizontal and vertical direction with respect to the vehicle.

8. A product comprising:
a vehicle including at least one powered lift arm connected thereto, a hand connected to the powered lift arm, and a body panel ramp, the hand being constructed and arranged to capture a grab pin on a container, and wherein the powered lift arm, the hand and the body panel ramp are constructed and arranged so that the power lift arm may load and unload a container onto and off of the vehicle wherein the container rolls over the body panel ramp, wherein the body panel ramp includes a first portion extending in a generally vertical direction so that a container may roll down the first portion and off of the vehicle.

9. A product as set forth in claim 8 further comprising a container having at least one grab pin thereon constructed and arranged to be received by the hand attached to the powered lift arm.

10. A product as set forth in claim 8 further comprising a push member connected to the vehicle and constructed and arranged to push a container resting on the vehicle in a direction towards the body panel ramp.

11. A product as set forth in claim 7 wherein the body panel ramp further includes a first portion extending in a generally vertical direction and coupled to the angled portion so that a container may be rolled along the angled portion and down the first portion and off of the vehicle.

12. A product comprising:
a vehicle including at least one powered lift arm connected thereto, a hand connected to the powered lift arm, and a body panel ramp, the hand being constructed and arranged to capture a grab pin on a container, and wherein the powered lift arm, the hand and the body panel ramp are constructed and arranged so that the power lift arm may load and unload a container onto and off of the vehicle wherein the container rolls over the body panel ramp, further comprising a container platform pivotally connected to the hand and constructed and arranged to carry a container as the container is moved on to the vehicle.

13. A method comprising:
providing a vehicle and a container, wherein the vehicle including at least one powered lift arm connected thereto, a hand connected to the powered lift arm, and a body panel ramp, the hand capturing a grab pin on the container,
unloading the container from the vehicle comprising moving the at least one power lift arm so that the container rolls along and off of the body panel ramp and off of the vehicle.

14. A method comprising:
providing a vehicle and a container, wherein the vehicle including at least one powered lift arm connected thereto, a hand connected to the powered lift arm, and a body panel ramp, the hand capturing a grab pin on the container, unloading the container from the vehicle comprising moving the at least one power lift arm so that the container rolls along and off of the body panel ramp and off of the vehicle, wherein the body panel ramp further includes a first portion extending in a generally vertical direction and coupled to an angled portion so that and wherein the container unloading comprises moving the container along the angled portion and down the first portion and off of the vehicle.

15. A method as set forth in claim 14 further comprising loading a second container onto the vehicle comprising lowering the at least one powered lift arm and moving the container so that the hand captures the grab pin of the container and lifting at least one powered lift arm so that the container rolls up the body panel ramp and onto the vehicle.

16. A method comprising:
providing a vehicle and a container, wherein the vehicle including at least one powered lift arm connected thereto, a hand connected to the powered lift arm, and a body panel ramp, the hand capturing a grab pin on the container,
unloading the container from the vehicle comprising moving the at least one power lift arm so that the container rolls along and off of the body panel ramp and off of the vehicle, wherein the push member comprises a push plate having a curved surface constructed and arranged so that a container having at least one wheel may roll along the curved surface of the push plate.

17. A method as set forth in claim 16 further comprising a powered push arm connected to the push member and wherein the moving the push member to push the container towards the body panel ramp comprises moving the powered push arm.

18. A method as set forth in claim 15 further comprising a power assist connected to the push member.

19. A method as set forth in claim 18 wherein the power assist comprises at least one of an electrically driven piston, a hydraulic piston, or a pneumatic piston.

20. A method as set forth in claim 14 further comprising providing a push member and moving the push member to push the container towards the body panel ramp before or at the same time as moving the at least one power lift arm so that the container rolls along and off of the body panel ramp and off of the vehicle.

21. A product as set forth in claim 1 wherein the body panel ramp comprises a first portion extending in a generally vertical direction from the surface on which the vehicle rest.

22. A product as set forth in claim 1 wherein the body panel ramp comprises a first portion extending in a generally vertical direction, and a second portion comprising a curved or bent, the second portion connected to the first portion.

23. A product as set forth in claim 1 wherein the body panel ramp comprises a free end.

24. A product as set forth in claim 13 wherein the body panel ramp comprises a first portion extending in a generally vertical direction from the surface on which the vehicle rest.

25. A product as set forth in claim 13 wherein the body panel ramp comprises a first portion extending in a generally vertical direction, and a second portion comprising a curved or bent, the second portion connected to the first portion.

26. A product as set forth in claim 13 wherein the body panel ramp comprises a free end.

\* \* \* \* \*